July 5, 1966     H. POLLAK     3,258,978
NAVIGATIONAL APPARATUS
Filed Oct. 26, 1960     2 Sheets-Sheet 1
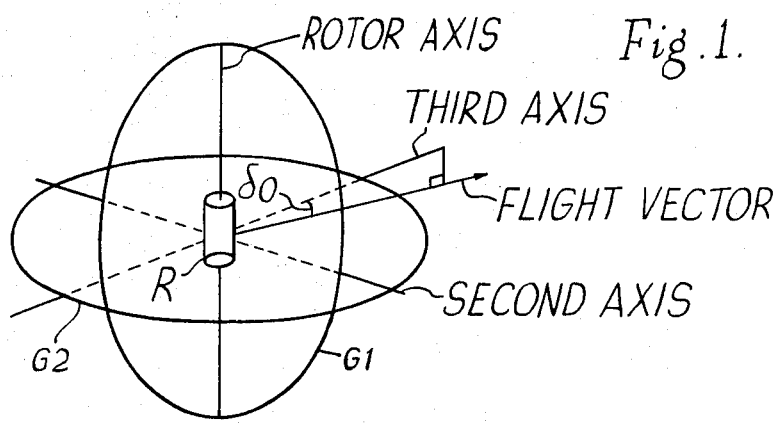
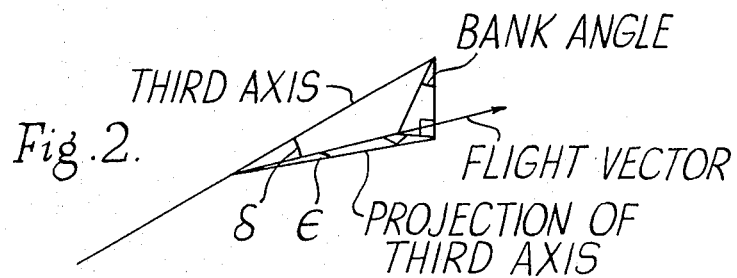
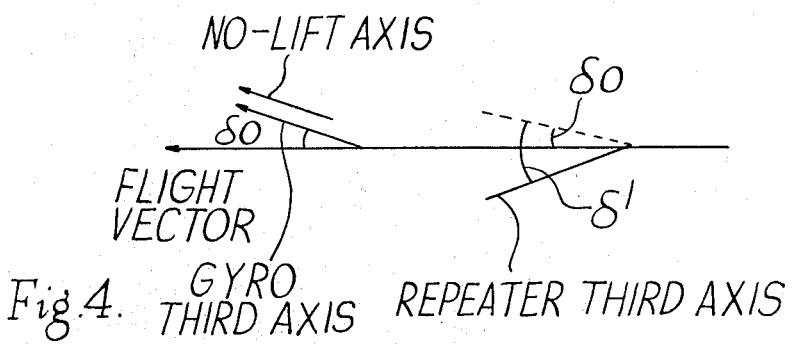
HEINZ POLLAK
INVENTOR
BY
Moore + Hall
ATTORNEY

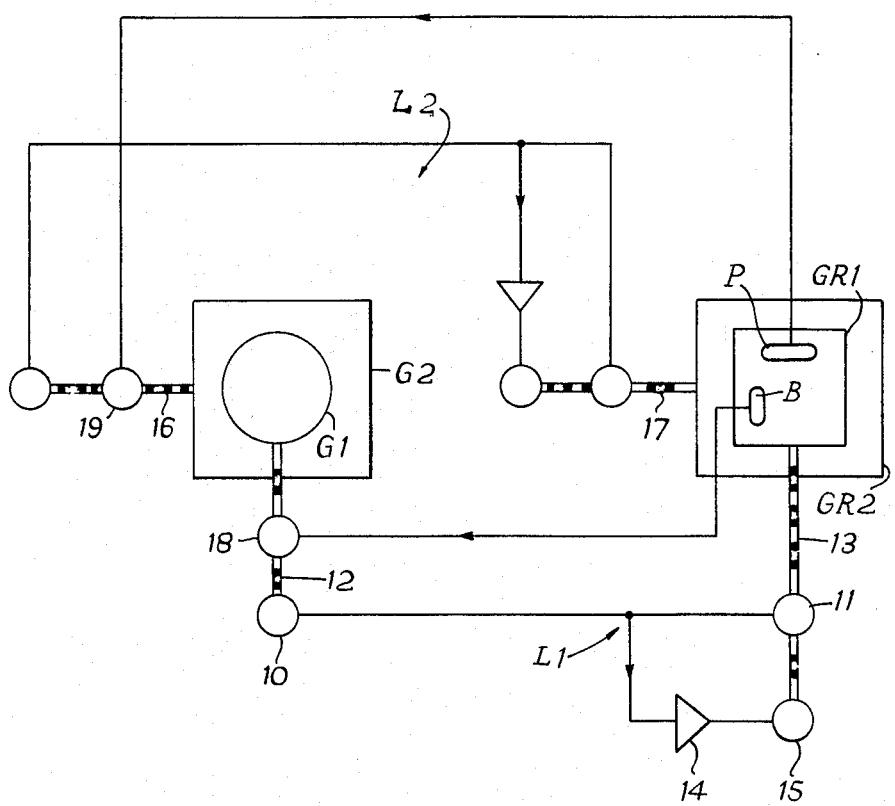

United States Patent Office 3,258,978
Patented July 5, 1966

3,258,978
NAVIGATIONAL APPARATUS
Heinz Pollak, Cheltenham, England, assignor to S. Smith & Sons (England) Limited, London, England, a British company
Filed Oct. 26, 1960, Ser. No. 65,174
Claims priority, application Great Britain, Oct. 28, 1959, 36,514/59
3 Claims. (Cl. 74—5.47)

The invention concerns improvements in erection corrections of gyroscopes.

The present invention relates to navigational apparatus in aircraft for sensing the attitude of the aircraft, of the kind comprising a gyroscopic device having a rotor rotatable on or in an arrangement of first and second pivotally interconnected supports, the rotor being mounted on the first support for rotation about a first axis, hereinafter referred to as the rotor axis, the first support being mounted on the second support for rotation about a second axis at right angles to the rotor axis and athwartships of the aircraft, and the second support being mounted on the craft for rotation about a third axis at right angles to the second axis and in that plane (hereinafter called "the fore and aft plane") which is, in straight, level and unaccelerated flight, vertical and contains the aircraft flight vector, and an erection system influenced by gravitational force and adapted to act on the gyroscopic device in such a manner as to bring the rotor axis of the gyroscopic device into a predetermined direction which is at a small angle to the direction of the gravitational force. Such apparatus is hereinafter referred to as of the kind specified. The said small angle can of course be zero angle.

In a known navigational apparatus of the kind specified for use in sensing the attitude of an aircraft, the first and second supports comprise inner and outer gimbals and the outer gimbal is so mounted inside the aircraft that in straight flight the pivotal axis thereof (the said third axis) is inclined to the flight vector at some angle, $\delta_0$. Since the pitch attitude of the aircraft is a function of the flight condition and since the outer gimbal axis is fixed in relation to the aircraft, the angle $\delta_0$ is not a constant but is itself a function of the flight condition.

The erection system comprises means responsive in straight, level, unaccelerated flight, to deviations of the rotor axis from the predetermined direction of gravity, that is the true vertical, to cause torques to be applied to the gimbals, which will bring or tend to bring the rotor axis back into its predetermined relationship with the vertical. In one form of apparatus, the means to control the restoring torques are switches influenced by gravity.

The second axis (on which the inner gimbal is pivoted in the outer) is usually horizontal and at right angles to the flight vector when the aircraft is flying straight and level. In this case a first gravity-sensitive switch or bank switch is mounted on either the inner or the outer gimbal in such a manner as to respond to any tilting of the second axis from the horizontal. The bank switch controls means for applying a torque about the second axis, which torque causes the gyroscope to precess about the third axis. The tilt is corrected in this way and the process of correction is known as bank erection.

A second gravity-sensitive switch or pitch switch is usually mounted on the inner gimbal and responds to tilting of the rotor axis from the predetermined direction in the vertical plane through the flight vector. The pitch switch controls means for applying a torque about the third axis, causing the gyroscope to precess about the second axis. This process of correction is known as pitch erection.

The gravity-sensitive switches may be, for example, mercury switches (of the well-known type in which a drop of mercury runs up and down a tube into which three or more electrodes are sealed) or pendulum switches.

Turning flight introduces problems in both bank and pitch erection. Centrifugal forces cause the apparent vertical (which in straight, level and unaccelerated flight is the true vertical) to depart from true vertical and the bank switch has therefore to be disconnected to prevent the rotor axis being aligned with apparent vertical. As is well-known pitch/bank erection, involving control of the bank erection torque motor by the pitch erection switch, is often used in turning flight. The present invention relates to problems in pitch erection.

It will now be assumed that the aircraft is banked into a co-ordinated turn. During the turn, the angle of incidence of the aircraft will have to be increased because of the increase in apparent gravity so that the angle $\delta_0$ increases to $\delta$. Furthermore if the aircraft is banked, that is rotated about the flight vector, the projection of the outer gimbal axis on to the plane containing the flight vector and a horizontal line perpendicular to the flight vector will no longer fall on the flight vector but will form a small angle with it, this angle being a function of the angle $\delta$ and the bank angle. Similarly, the plane of the pitch switch, that is to say for example, the plane in which the mercury drop or the pendulum bob is deflected, will no longer be parallel to the flight vector and the switch will be under the influence of both gravity and centrifugal force developed from the turning movement. Thus, the pitch erection system will tend to move the rotor axis of the gyroscopic device out of the said predetermined direction and into a displaced position where the centrifugal force and the gravitational force combine to centralise the switch.

It will readily be seen that the disturbing effect of the centrifugal force during the banked turn is proportional to $\delta$ and vanishes when $\delta$ is zero. The effect of the centrifugal force could therefore be eliminated by an initial depression of the outer gimbal axis below the flight vector such that $\delta_0$ is negative and $\delta$ is zero. The angle $\delta$ cannot, however, be made to vanish under all conditions of turning flight because the angle $\delta_0$ varies with the flight conditions and the increment $\delta - \delta_0$ is a function of both the flight conditions and the angle of bank. Nevertheless, an initial depression of the outer gimbal axis could be found which would, for most conditions of flight, maintain the angle $\delta$ at an acceptably small value.

There is, however, a reason which makes such initial depression unattractive. As long as the rotor axis has its desired relationship with the true vertical in straight unaccelerated flight, it measures in effect the elevation of the outer gimbal axis, that is to say, the angle between this axis and a horizontal plane. An elevation which, to a first order of approximation, does not change between straight and level flight and a co-ordinated banked turn, is that of the no-lift axis. By the no-lift axis is meant an axis fixed in the aircraft such that when it coincides with the aircraft's flight path no lift will be generated by the aerodynamic lifting surfaces of the aircraft. If the gyroscopic device is to read the same before and during a turn, which is very desirable, its outer gimbal axis should therefore be parallel to the no-lift axis. This normally requires a positive angle $\delta_0$, which may be quite substantial in the case of high performance aircraft flying at high altitudes (which is the type of aircraft which is more likely to bank very steeply with a consequent large change between $\delta$ and $\delta_0$ and marked centrifugal force effect). There are thus two contradictory requirements: correct indication of the undisturbed gyroscopic device, demanding a raising of the outer gimbal axis above the flight vector, and the reduction of centrifugal effects on the pitch switch, demanding a depression below the flight vector.

It is an object of the present invention to provide navigational apparatus of the kind specified which meets both the requirements that the indication does not change substantially between straight and turning flight and the gyro rotor axis is not substantially deflected from its proper predetermined direction by the action of centrifugal force on the pitch switch.

According to the present invention there is provided navigational apparatus of the kind specified, wherein the pitch erection system comprises a gravity-sensitive device mounted on or in a repeater arrangement of first and second pivotally interconnected supports so arranged and driven under the control of the gyroscopic device as to execute angular displacements corresponding to the displacements of the first and second supports respectively of the gyroscopic device, the gravity-sensitive device being so coupled to the first support of the repeater as to respond to variations in the pitch angle of the first support of the repeater to control the application of a pitch-erecting torque to the gyroscopic device, the axis of the second support of the gyroscopic device being substantially aligned with the no lift axis of the aircraft. The axis of the second support of the repeater arrangement is in the fore and aft plane but depressed with respect to the axis of the gyroscopic device by an amount such that movements of the rotor axis out of the said predetermined direction in banked, non-straight flight are, at least on the average, substantially reduced.

The invention will now be further described and explained by way of example with reference to the accompanying drawings which are purely diagrammatic as the individual parts involved are well known in themselves. In the drawings:

FIG. 1 is a diagram representing a gyro-vertical in an aircraft in straight, level flight, FIG. 2 is a diagram showing the third axis of the gyro-vertical for the case of a banked turn, FIG. 3 is a block diagram of apparatus embodying the invention, and FIG. 4 is an explanatory diagram.

In FIG. 1 a rotor R of a gyro-vertical is mounted in inner and outer gimbals G1 and G2. The rotor axis is indicated as vertical. The rotational axes of the gimbals G1 and G2 are shown as the second axis and the third axis respectively. The angle $\delta_0$ between the third axis and the flight vector is indicated.

The previously mentioned difficulty arising in a banked turn is illustrated in FIG. 2. The vertical plane through the third axis makes a small angle $\epsilon$ with the flight vector, $\epsilon$ being dependent upon $\delta$ and the bank angle. The said vertical plane is the plane of the pitch switch which is subjected to centrifugal forces varying with sin $\epsilon$. These forces disappear if $\epsilon$ is zero which is readily seen to be the case if $\delta$ is zero.

As explained above $\delta$ can be made to approximate to zero for most turning conditions if $\delta_0$ in FIG. 1 is made an appropriate negative value, which cannot however be done because of other considerations.

Referring now to FIG. 3 the rotor is rotatable within the inner gimbal G1 which is free to pivot within the outer gimbal G2 about an axis at right angles to the vertical rotor axis. The outer gimbal G2 is mounted in the aircraft in such a way that it is free to pivot about the third axis which is at right angles to the pivotal axis of the inner gimbal G1 and is arranged to be parallel to the no-lift axis of the aircraft.

A repeater unit is provided at a remote point and comprises an arrangement of inner and outer gimbals GR1 and GR2 corresponding to those of the gyro-vertical. The outer gimbal is mounted in the aircraft for pivotal movement about an axis lying in the vertical plane containing the flight vector (the fore and aft plane) in straight, level flight and depressed with respect to the axis of the outer gimbal G2 through a predetermined angle $\delta'$.

The inner gimbal GR1 is servo driven from the inner gimbal G1 through a conventional servo loop L1. This comprises position comparators or signal pick-offs 10 and 11 coupled to the gimbal shafts 12 and 13 and controlling the input to an amplifier 14 feeding a motor 15 coupled to the shaft 13 of the gimbal GR1. Each position comparator can be a synchro or a potentiometer for example generating a signal representing the angle of the shaft to which the comparator is coupled. In order that the inner gimbal GR1 of the repeater shall be level when the rotor axis is vertical (considering straight and level flight) the gimbal shafts 12 and 13 have to be rotated in opposite directions from the datum positions, owing to the different alignments of the gimbal axes. This condition is obtained by arranging that the signals fed to the amplifier 14 is zero when the required relative orientation exists. A similar loop L2 controls the shaft 17 of the gimbal GR2 from the shaft 16 of the gimbal G2. In this case however the shafts 12 and 13 are parallel and level (in straight and level flight) and no relative orientation of the shafts 16 and 17 is required.

A bank switch B in the form of a mercury switch is fixed to the inner gimbal GR1 (or alternatively to the outer gimbal GR2) with the plane of the switch parallel to the vertical and the second axis (FIG. 1). In straight flight this switch detects any banking tilts at the repeater station and controls the energization of a torque motor 18 coupled to the shaft 12 to effect bank erection. This connection will of course be broken when pitch/bank erection is brought into operation in turning flight. Similarly a pitch switch P fixed to the gimbal GR1 controls the energisation of a torque motor 19 coupled to the shaft 16 to effect pitch erection.

In the above described embodiment, by aligning the outer gimbal axes differently as stated, both the aims previously mentioned can be obtained simultaneously. By aligning the outer gimbal axis of the gyro-vertical parallel to the no-lift axis the system signals the same elevation during straight and turning flight as long as the gyro remains vertical. At the same time, it is arranged that the pitch switch is centralised when the gyro is vertical.

This is illustrated in FIG. 4, which shows straight, level flight conditions with $\delta_0$ for the gyro positive. The third axis of the repeater is depressed below $\delta_0$ by the angle $\delta'$.

The required angular misalignment $\delta'$ between the gimbal axes, is, strictly speaking, a variable function of flight conditions and bank angle. For the sake of mechanical simplicity and reliability, the angle is fixed but is so selected as to minimize the average detrimental effects from the action of the centrifugal forces.

Any number of signal transmitters (not shown) can be coupled to the shafts 13 and 17 for the purpose of transmitting signals indicating bank and pitch at remote indicators, repeaters and so on. The transmitters may be synchros or potentiometers for example.

It will be apparent that there are other possible embodiments of the principle underlying the above arrangement in which the normally rigid connection between the gyro and its monitoring switches is abandoned and replaced by a servo or linkage drive devised to bring the switch or switches into a more suitable position relative to gravity and centrifugal force. The arrangement hereinbefore described is a preferred embodiment as it achieves the desired result by a simple modification of apparatus which has a number of other features which by themselves justify its existence and the necessary amount of electromechanical complexity.

In the embodiment described the bank switch as well as the pitch switch is located at the repeater station. For the purposes of the invention it is only necessary for the pitch switch to be at the repeater station. The bank switch can be at the gyroscope.

When switches are mounted on a gyroscope it is usual to employ mercury switches which are small and light. Any switch mounted at a repeater station however can conveniently be a pendulum switch instead of a mercury switch.

I claim:

1. A gyroscopic navigational system in an aircraft for sensing the attitude thereof comprising a gyroscope device having a rotor and first and second pivotally-interconnected supports supporting said rotor, said rotor being rotatable on said first support about a first rotor axis, said first support being mounted on said second support for rotation about a second axis perpendicular to said rotor axis and athwartships of the aircraft, and said second support being mounted on the aircraft for rotation about a third axis perpendicular to said second axis and substantially aligned with the no lift axis of the aircraft, a repeater arrangement of first and second pivotally-interconnected repeater supports, servo means driving said repeater supports to execute angular displacements corresponding to the displacements of said first and second gyroscope device supports respectively and a pitch erection system comprising a gravity-sensitive device supported by said repeater arrangement and coupled mechanically to said first repeater support and a pitch-erecting torque motor for said gyroscopic device controlled by said gravity-sensitive device, the axis of said second repeater support lying in the fore and aft plane of the aircraft but depressed with respect to said third axis whereby deviations of said rotor axis from a predetermined direction at a small angle to the direction of gravitational force in turning flight are reduced.

2. The combination set forth in claim 1, said repeater supports comprising an outer gimbal axis and an inner gimbal axis, said servo means operating to align one of said gimbal axes with the no-lift axis of the system whereby to minimize the effects of the action of centripetal forces on the system.

3. In combination an aircraft having a navigational apparatus comprising a gyroscope device having a rotor axis and first and second pivotal supports, with orthogonal pivotal axes, a repeater arrangement having first and second repeater supports connected to said gyroscope device, said repeater supports having axes corresponding to those of said first and second gyroscope supports and repeating the movements of said gyroscope first and second supports respectively, a pitch erection means comprising a gravity-sensitive device mounted on said repeater arrangement and connected to the first support of said repeater arrangement so as to respond to variations in pitch angle of said first repeater support to control application of a pitch-erecting torque to said gyroscope device, the axis of said second repeater support being in the fore and aft plane of the aircraft and depressed with respect to the axis of said second support of said gyroscope device by an amount such that undesired movements of the rotor axis of said gyro device are substantially reduced.

References Cited by the Examiner

UNITED STATES PATENTS

| | | | |
|---|---|---|---|
| 2,188,606 | 1/1940 | Koster | 74—5.8 X |
| 2,533,217 | 12/1950 | Braddon | 74—5.47 X |
| 2,880,617 | 4/1957 | Cotton | 74—5.47 |
| 2,936,628 | 5/1960 | Granquist | 74—5.47 |

FOREIGN PATENTS 902,489   8/1962   Great Britain.

MILTON KAUFMAN, *Primary Examiner.*

DON A. WAITE, BROUGHTON G. DURHAM,
*Examiners.*

T. W. SHEAR, *Assistant Examiner.*